United States Patent
Zandi Hanjari

(10) Patent No.: US 12,064,306 B2
(45) Date of Patent: Aug. 20, 2024

(54) DENTAL IMPLANT LOCATOR CLEANING ASSEMBLY

(71) Applicant: Mahnaz Zandi Hanjari, Los Angeles, CA (US)

(72) Inventor: Mahnaz Zandi Hanjari, Los Angeles, CA (US)

(*) Notice: Subject to any disclaimer, the term of this patent is extended or adjusted under 35 U.S.C. 154(b) by 628 days.

(21) Appl. No.: 17/341,500

(22) Filed: Jun. 8, 2021

(65) Prior Publication Data

US 2022/0387155 A1    Dec. 8, 2022

(51) Int. Cl.
  *A61C 17/36*   (2006.01)
  *A61C 8/00*    (2006.01)

(52) U.S. Cl.
  CPC ............ *A61C 17/36* (2013.01); *A61C 8/0089* (2013.01)

(58) Field of Classification Search
  CPC .............. A46B 11/063; A46B 11/0006; A61C 17/0202; A61C 17/0211; A61C 17/024; A61C 17/028; A61C 17/032; A61C 8/0089; B24B 29/00; B24B 29/005; B24B 29/04
  See application file for complete search history.

(56) References Cited

U.S. PATENT DOCUMENTS

| | | |
|---|---|---|
| 4,301,567 A | 11/1981 | Tucker |
| 5,249,962 A | 10/1993 | Ascher |
| 5,566,416 A | 10/1996 | Karls |
| D388,958 S | 1/1998 | Hartwein |
| 8,739,350 B1 | 6/2014 | Lackenbauer |
| 2012/0028215 A1* | 2/2012 | Wade .................. A61C 3/06 433/142 |
| 2014/0255864 A1* | 9/2014 | Machata ............. A61C 7/146 433/3 |
| 2015/0072308 A1 | 3/2015 | Kim |

FOREIGN PATENT DOCUMENTS

CN     114767312 A  *  7/2022
WO     WO2016164354    10/2016

* cited by examiner

*Primary Examiner* — Shay Karls

(57) ABSTRACT

A dental implant locator cleaning assembly includes a cleaning head that is attachable to a periodontal tool which employs oscillation and pressurized water for cleaning dental implants. The cleaning head has a plurality of tabs oriented to surround a dental implant locator for scrubbing an outer surface of the dental implant locator when the periodontal tool is turned on. The cleaning head has a fluid nozzle that is centrally positioned therein and is surrounded by the plurality of tabs. The fluid nozzle extends into a well in the dental implant locator and the fluid nozzle is in fluid communication with the periodontal tool when the cleaning head is attached to the periodontal tool. In this way the fluid nozzle can spray a fluid into the well in the dental implant locator for cleaning debris from the well in the dental implant locator.

5 Claims, 4 Drawing Sheets

DENTAL IMPLANT LOCATOR CLEANING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to cleaning devices and more particularly pertains to a new cleaning device for cleaning a dental implant locator.

(2) Description of Related Art Including Information Disclosed Under 37 CFR 1.97 and 1.98

The prior art relates to cleaning devices including a variety of cylindrical cleaners that includes bristles for cleaning a cylindrical object. Additionally, the prior art discloses a variety of dental implant cleaners that are structured to surround a dental implant locator for cleaning the dental implant locator.

BRIEF SUMMARY OF THE INVENTION

An embodiment of the disclosure meets the needs presented above by generally comprising a cleaning head that is attachable to a periodontal tool which employs oscillation and pressurized water for cleaning dental implants. The cleaning head has a plurality of tabs oriented to surround a dental implant locator for scrubbing an outer surface of the dental implant locator when the periodontal tool is turned on. The cleaning head has a fluid nozzle that is centrally positioned therein and is surrounded by the plurality of tabs. The fluid nozzle extends into a well in the dental implant locator and the fluid nozzle is in fluid communication with the periodontal tool when the cleaning head is attached to the periodontal tool. In this way the fluid nozzle can spray a fluid into the well in the dental implant locator for cleaning debris from the well in the dental implant locator.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
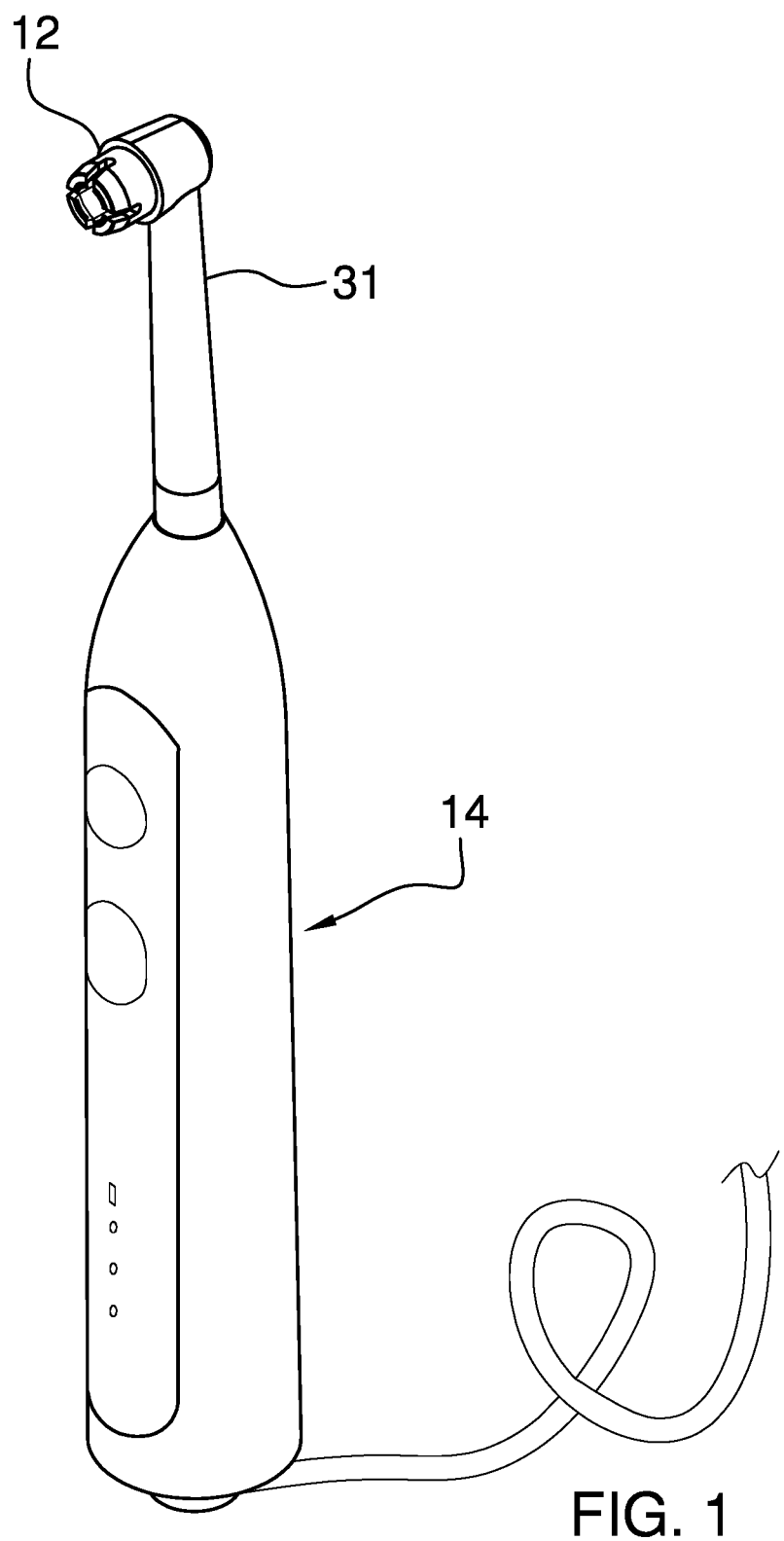
FIG. 1 is a perspective view of a dental implant locator cleaning assembly according to an embodiment of the disclosure showing a cleaning head being attached to a periodontal tool.
Figure 2:
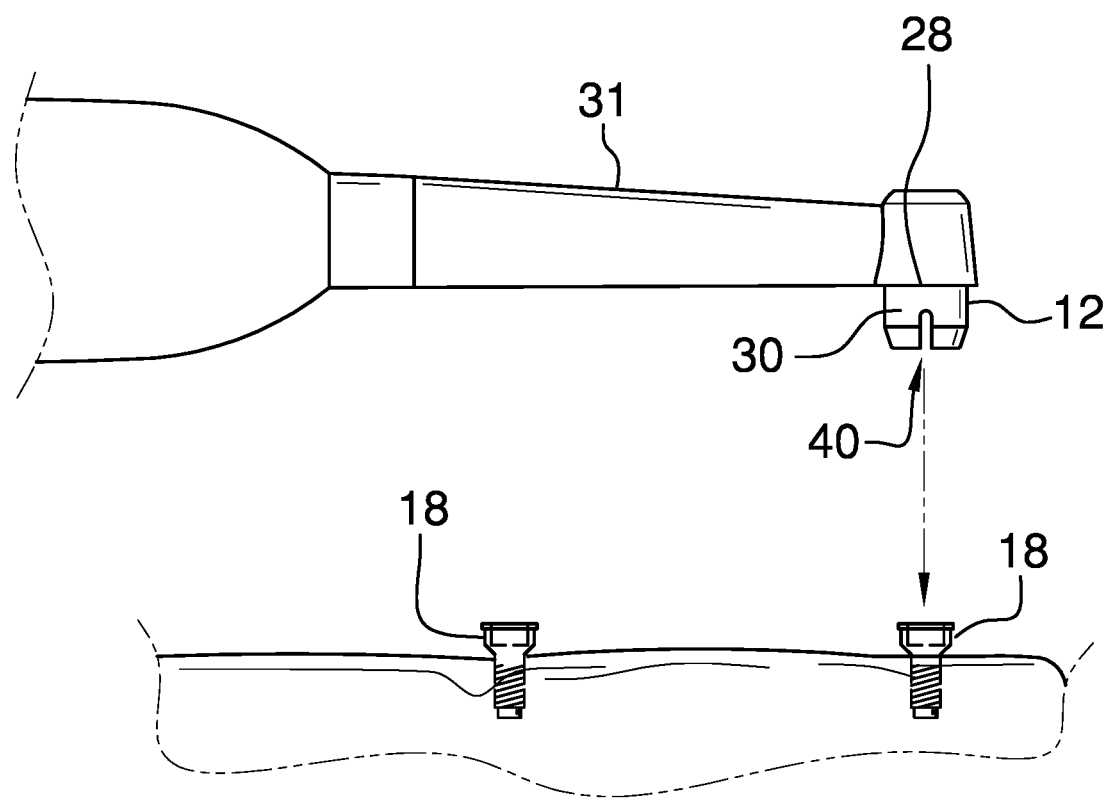
FIG. 2 is a perspective in-use view of an embodiment of the disclosure showing a cleaning head being positioned on a dental implant locator.
Figure 3:
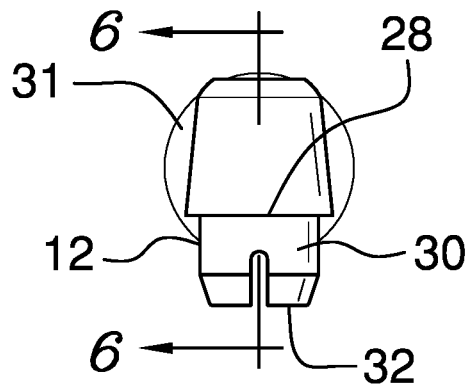
FIG. 3 is a front view of an embodiment of the disclosure.
Figure 4:
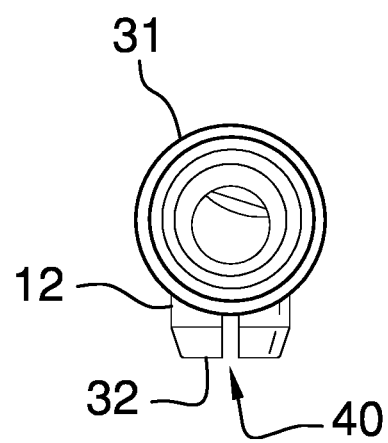
FIG. 4 is a back view of an embodiment of the disclosure.
Figure 5:
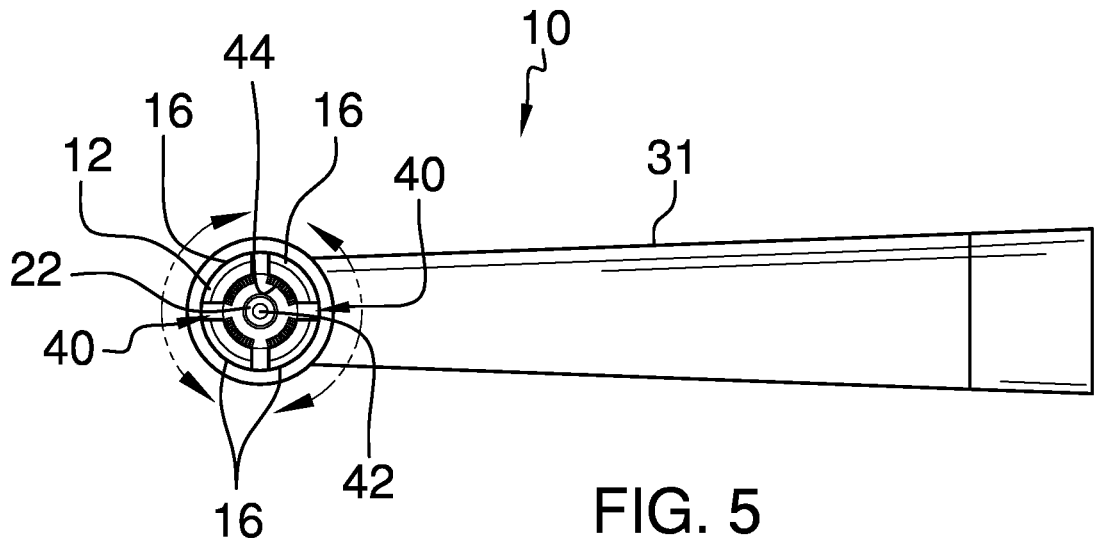
FIG. 5 is a bottom view of an embodiment of the disclosure.
Figure 6:
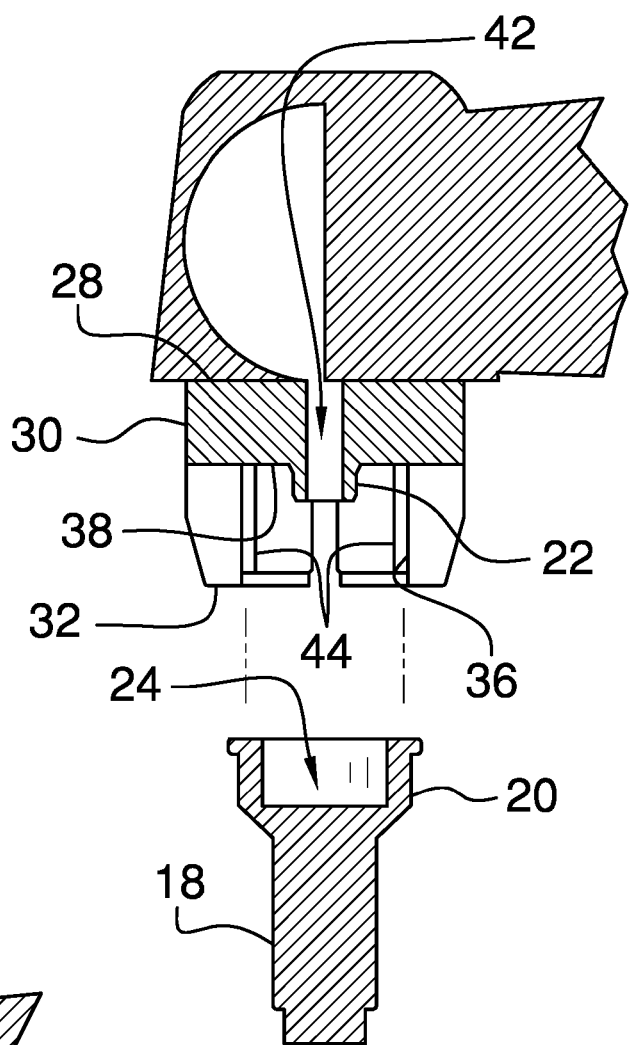
FIG. 6 is a cross sectional view taken along line 6-6 of FIG. 3 of an embodiment of the disclosure.
Figure 7:
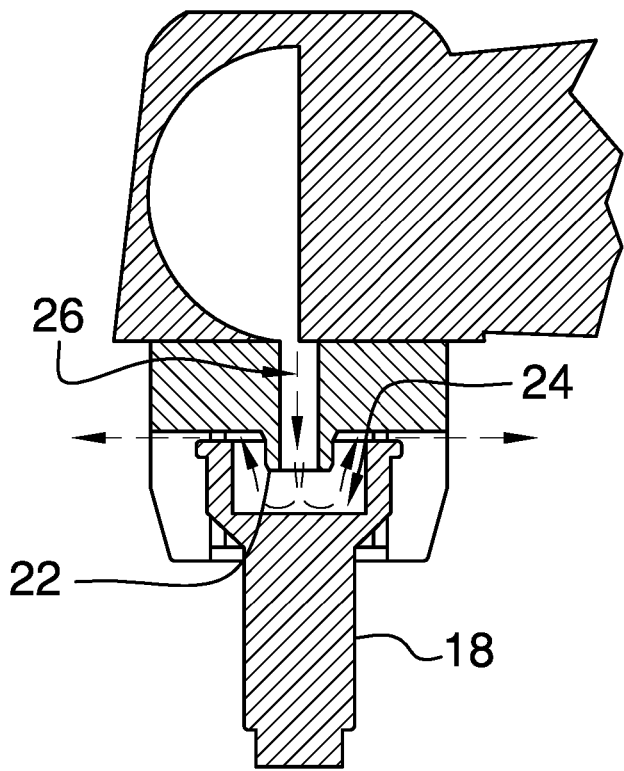
FIG. 7 is a cross sectional view taken along line 6-6 of FIG. 3 of an embodiment of the disclosure showing a cleaning head being positioned around a dental implant locator.

With reference now to the drawings, and in particular to FIGS. 1 through 7 thereof, a new cleaning device embodying the principles and concepts of an embodiment of the disclosure and generally designated by the reference numeral 10 will be described.

As best illustrated in FIGS. 1 through 7, the dental implant locator cleaning assembly 10 generally comprises a cleaning head 12 that is attachable to a periodontal tool 14 which employs oscillation and pressurized water for cleaning dental implants. The periodontal tool 14 may be a WATERPIK® Sonic Fusion that is manufactured by WaterPik Inc, 1730 East Prospect Road, Fort Collins, CO 80553. The cleaning head 12 has a plurality of tabs 16 that are each oriented to encircle a centerline of the cleaning head 12. In this way the plurality of tabs 16 can surround a dental implant locator 18 thereby facilitating the tabs 16 to scrub an outer surface 20 of the dental implant locator 18 when the periodontal tool 14 is turned on. The dental implant locator 18 will be secured onto a dental implant which penetrates into the jaw bone. The dental implant locator 18 is located above the gum line and is employed to attach a removable denture to the dental implant.

The cleaning head 12 has a fluid nozzle 22 that is centrally positioned therein and that is surrounded by the plurality of tabs 16. In this way the fluid nozzle 22 can extend into a well 24 in the dental implant locator 18. Additionally, the fluid nozzle 22 is in fluid communication with the periodontal tool 14 when the cleaning head 12 is attached to the periodontal tool 14. In this way the fluid nozzle 22 can spray a fluid 26 into the well 24 in the dental implant locator 18 for cleaning debris from the well 24 in the dental implant locator 18. The fluid 26 may be water that is sprayed by the periodontal tool 14.

The cleaning head 12 has basal end 28 and an outer wall 30 extending away from the basal end 28, and the outer wall 30 is continuously arcuate about a centerline of the basal end 28. The outer wall 30 has a distal end 32 with respect to the basal end 28 defining a well 34 in the cleaning head 12 which extends toward the basal end 28. The outer wall 30 has an inside surface 36 and the well 34 in the cleaning head 12 has a lower bounding surface 38. The outer wall 30 has a plurality of slots 40 each extending from the distal end 32 toward lower bounding surface 38. The slots 40 are spaced apart from each other and are distributed around a full circumference of the outer wall 30 such that plurality of slots 40 defines the plurality of tabs 16. As is most clearly shown in FIGS. 4 and 5, the cleaning head 12 is integrated into an existing brush stem 31 that is designed for use with the Waterpik® Sonic Fusion. Additionally, the cleaning head 12 is oriented at a right angle with the existing brush stem 31.

The fluid nozzle 22 extends away from the lower bounding surface 38 of the well 34 in the cleaning head 12 and the fluid nozzle 22 is centrally positioned on the lower bounding surface 38. The fluid nozzle 22 has a distal end 32 with respect to the lower bounding surface 38. Additionally, the cleaning head 12 has a fluid opening 42 extending through the basal end 28 and the distal end 32 of the fluid nozzle 22. In this way the fluid opening 42 receives a pressurized fluid from the periodontal tool 14 when the cleaning head 12 is attached thereto.

A plurality of bristles 44 is provided and each of the bristles 44 is disposed on a respective one of the tabs 16. In this way each of the bristles 44 can frictionally engage the outer surface 20 of the dental implant locator 18 when the cleaning head 12 is positioned therearound for scrubbing the outer surface 20 of the dental implant locator 18. Each of the bristles 44 is positioned on the inside surface 38 of the outer wall 30 of the cleaning head 12 such that each of the bristles 44 is positioned in the well in the cleaning head 12. The bristles 44 are distributed between the distal end 32 of the outer wall 30 and the lower bounding surface 38 of the well 34 in the cleaning head 12. Moreover, the bristles 44 are distributed around a full circumference of the inside surface 38 of the outer wall 30. The cleaning head 12 may be comprised of a resiliently deformable material, including but not being limited to, rubber or silicone, thereby inhibiting the cleaning head 12 from damaging or abrading the dental implant locator 18.

In use, the cleaning head 12 is attached to the periodontal tool 14 and the cleaning head 12 is positioned around the dental implant locator 18 such that the cleaning head 12 surrounds the dental implant locator 18 and the fluid nozzle 22 extends into the well 24 in the dental implant locator 18. The periodontal tool 14 is turned on such that the cleaning head 12 scrubs the outer surface 20 of the dental implant locator 18 to clean the dental implant locator 18. Additionally, the fluid nozzle 22 sprays the pressurized fluid into the well 24 in the dental implant locator 18 to clean the well 24 in the dental implant locator 18. In this way the dental implant locator 18 can be thoroughly cleaned thereby facilitating the best possible health of the gum line surrounding the dental implant locator 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A dental implant locator cleaning assembly for cleaning an outer surface of a dental implant locator and for spraying a fluid into a well in the dental implant locator for thoroughly cleaning the dental implant locator, said assembly comprising:

a cleaning head being attachable to a periodontal tool that employs oscillation and pressurized water for cleaning dental implants, said cleaning head having a plurality of tabs being oriented to encircle a centerline of said cleaning head wherein said plurality of tabs is configured to surround a dental implant locator thereby facilitating said tabs to scrub an outer surface of the dental implant locator when said periodontal tool is turned on, said cleaning head having a fluid nozzle being centrally positioned therein and being surrounded by said plurality of tabs wherein said fluid nozzle is configured to extend into a well in the dental implant locator, said fluid nozzle being in fluid communication with the periodontal tool when said cleaning head is attached to the periodontal tool wherein said fluid nozzle is configured to spray a fluid into the well in the dental implant locator for cleaning debris from the well in the dental implant locator;

a plurality of bristles, each of said bristles being disposed on a respective one of said tabs wherein each of said bristles is configured to frictionally engage the outer surface of the dental implant when said cleaning head is positioned therearound for scrubbing the outer surface of the dental implant;

wherein said cleaning head has a basal end and an outer wall extending away from said basal end, said outer wall being continuously arcuate about a centerline of said basal end, said outer wall having a distal end with respect to said basal end defining a well in said cleaning head which extends toward said basal end, said outer wall having an inside surface, said well in said cleaning head having a lower bounding surface; and wherein said fluid nozzle extends outwardly away from said lower bounding surface into said well in said cleaning head, said fluid nozzle being centrally positioned on said lower bounding surface, said fluid nozzle having a distal end with respect to said lower bounding surface.

2. The assembly according to claim 1, wherein said outer wall has a plurality of slots each extending from said distal end toward lower bounding surface, said slots being spaced apart from each other and being distributed around a full circumference of said outer wall such that plurality of slots defines said plurality of tabs.

3. The assembly according to claim 1, wherein said cleaning head has a fluid opening extending through said basal end and said distal end of said fluid nozzle wherein said fluid opening is configured to receive a pressurized fluid from the periodontal tool when said cleaning head is attached thereto.

4. The assembly according to claim 1, wherein each of said bristles is positioned on said inner surface of said outer wall of said cleaning head such that each of said bristles is positioned in said well in said cleaning head, said bristles being distributed between said distal end of said outer wall and said lower bounding surface of said well in said cleaning head, said bristles being distributed around a full circumference of said inner surface of said outer wall.

5. A dental implant locator cleaning assembly for cleaning an outer surface of a dental implant locator and for spraying a fluid into a well in the dental implant locator for thoroughly cleaning the dental implant locator, said assembly comprising:

a cleaning head being attachable to a periodontal tool that employs oscillation and pressurized water for cleaning dental implants, said cleaning head having a plurality of tabs being oriented to encircle a centerline of said cleaning head wherein said plurality of tabs is configured to surround a dental implant locator thereby facilitating said tabs to scrub an outer surface of the dental implant locator when said periodontal tool is turned on, said cleaning head having a fluid nozzle being centrally positioned therein and being surrounded by said plurality of tabs wherein said fluid nozzle is configured to extend into a well in the dental implant locator, said fluid nozzle being in fluid communication with the periodontal tool when said cleaning head is attached to the periodontal tool wherein said fluid nozzle is configured to spray a fluid into the well in the dental implant locator for cleaning debris from the well in the dental implant locator, said cleaning head having basal end and an outer wall extending away from said basal end, said outer wall being continuously arcuate about a centerline of said basal end, said outer wall having a distal end with respect to said basal end defining a well in said cleaning head which extends toward said basal end, said outer wall having an inside surface, said well in said cleaning head having a lower bounding surface, said outer wall having a plurality of slots each extending from said distal end toward lower bounding surface, said slots being spaced apart from each other and being distributed around a full circumference of said outer wall such that plurality of slots defines said plurality of tabs, said fluid nozzle extending outwardly away from said lower bounding surface into said well in said cleaning head, said fluid nozzle being centrally positioned on said lower bounding surface, said fluid nozzle having a distal end with respect to said lower bounding surface, said cleaning head having a fluid opening extending through said basal end and said distal end of said fluid nozzle wherein said fluid opening is configured to receive a pressurized fluid from the periodontal tool when said cleaning head is attached thereto; and a plurality of bristles, each of said bristles being disposed on a respective one of said tabs wherein each of said bristles is configured to frictionally engage the outer surface of the dental implant when said cleaning head is positioned therearound for scrubbing the outer surface of the dental implant, each of said bristles being positioned on said inner surface of said outer wall of said cleaning head such that each of said bristles is positioned in said well in said cleaning head, said bristles being distributed between said distal end of said outer wall and said lower bounding surface of said well in said cleaning head, said bristles being distributed around a full circumference of said inner surface of said outer wall.

* * * * *